UNITED STATES PATENT OFFICE.

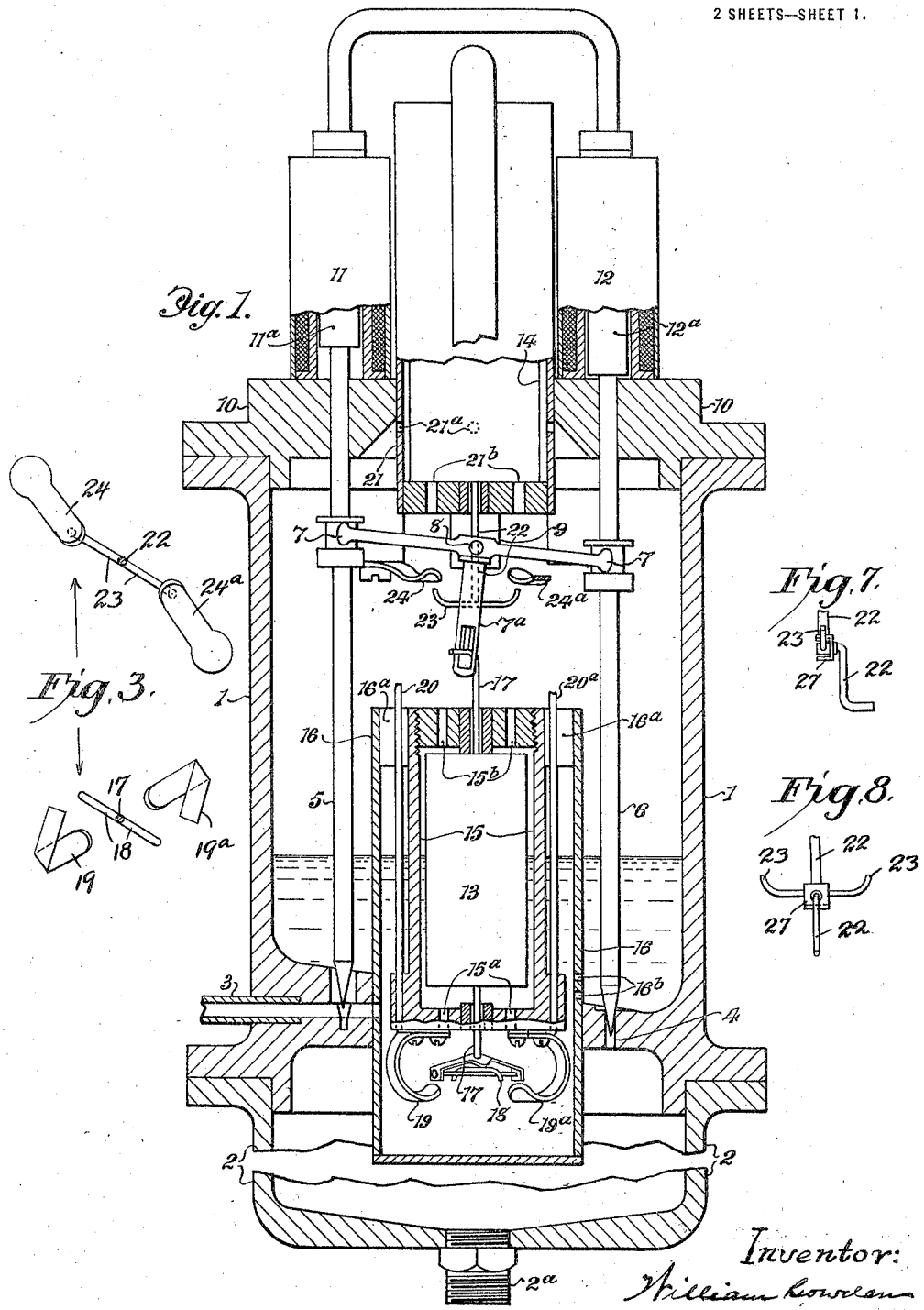

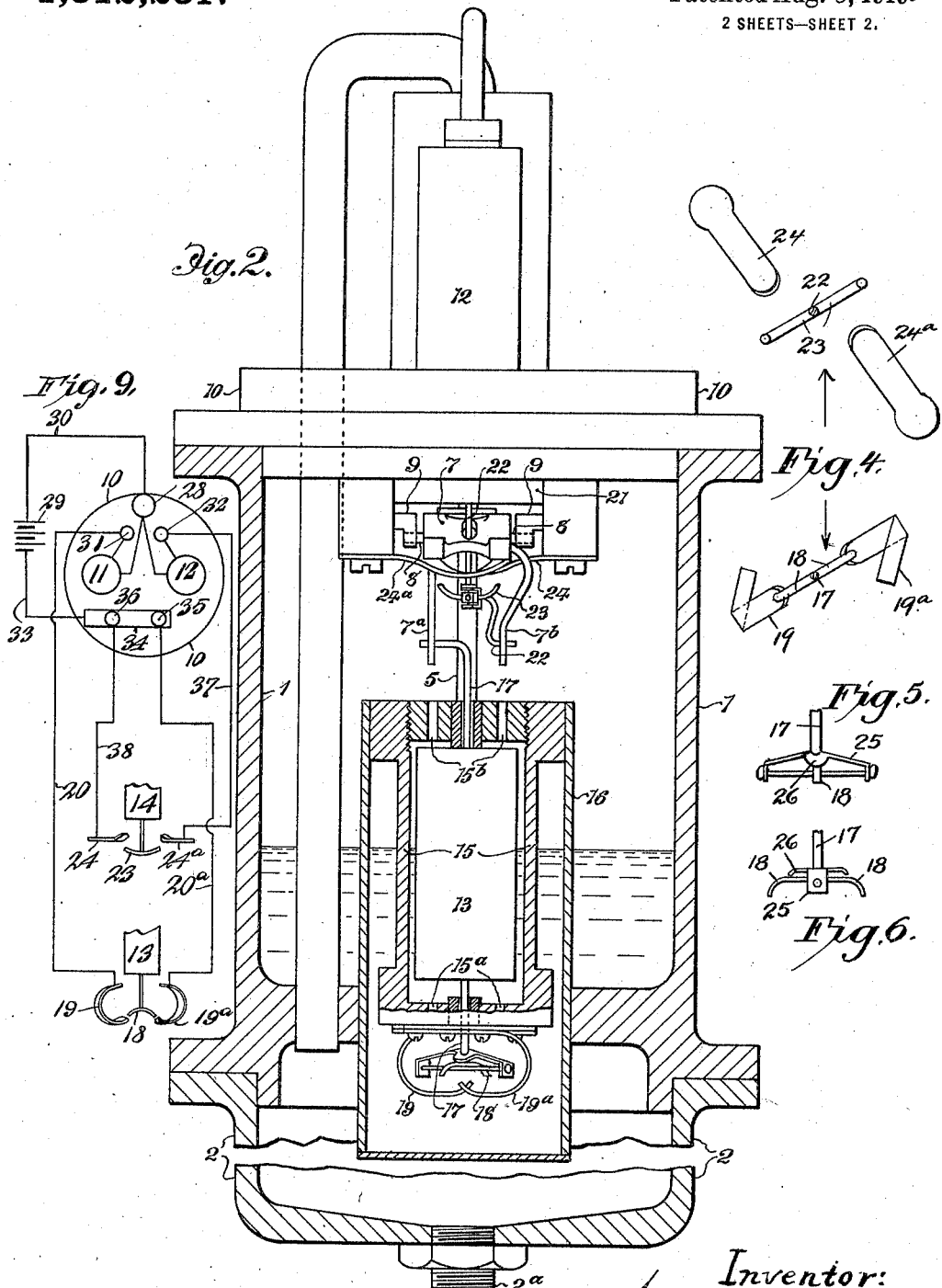

WILLIAM BOWDEN, OF MANCHESTER, ENGLAND.

LIQUID-METER.

1,312,231. Specification of Letters Patent. Patented Aug. 5, 1919.

Application filed October 15, 1918. Serial No. 258,232.

*To all whom it may concern:*

Be it known that I, WILLIAM BOWDEN, a subject of the King of Great Britain and Ireland, and a resident of Manchester, in the county of Lancaster, England, have invented certain new and useful Improvements in Liquid-Meters, of which the following is a specification.

This invention relates to meters for delivering measured quantities of liquids and especially to meters of the kind comprising a measuring chamber having an inlet from a storage tank or the like and an outlet to a receiving chamber or the like, valves adapted to open the inlet from the storage tank or the like to the measuring chamber and close the outlet from the latter to the receiving chamber or the like, and vice versa, alternately, and electro-magnetic devices, the circuits of which are controlled by switches actuated by variations in the level or flow of the liquid to so operate the valves. The object of the invention is to insure a quick and clean action of the switches which control the circuits of the valve-operating electro-magnet devices.

According to the invention, the circuits of the valve-operating electro-magnetic devices are opened simultaneously with the operation of the valves.

The accompanying drawings illustrate one embodiment of the invention in a meter of the kind described in my co-pending application filed 5th June 1917 under Serial No. 172,884, Figures 1 and 2 being elevations partly in section and at right angles to each other, of so much of the meter as is necessary to illustrate the invention, Figs. 3 and 4 plans showing the float-actuated switches in their different positions, Figs. 5 and 6 and 7 and 8 detached elevations at right angles to each other of the lower and upper float - actuated switch - members, respectively, and Fig. 9 is a diagram of the electrical connections.

Referring to the drawings, 1 is the measuring chamber, 2 the receiving chamber, 3 the inlet to the former, 4 the outlet therefrom to the receiving chamber 2, and $2^a$ the draw-off outlet from the latter, to which the carbureter of the engine is connected.

As before, the inlet 3 and outlet 4 are controlled by valves 5 and 6 respectively, operatively connected by a rocking lever 7 pivoted at 8 in brackets 9 on the underside of cover 10 of the chamber 1, so that when one valve is raised and opened, the other is simultaneously depressed and closed, and the valves 5, 6 are operated by solenoids 11, 12 respectively, on the top of the cover 10 and provided with plungers or cores $11^a$, $12^a$ to which the stems of the valves 5, 6 are connected.

The circuits of the solenoids 11, 12 are controlled by floats 13, 14 respectively. The lower float 13 operates in a casing 15 arranged in a chamber 16 disposed in the lower part of the measuring chamber 1 and extending into the receiving chamber 2. The casing 15 communicates at the bottom with the chamber 16 by holes or passages $15^a$, and at the top it communicates with the measuring chamber 1 by passages $15^b$. The chamber 16 communicates with the inlet 3 and with the measuring chamber 1 by passages $16^a$ at the top and holes $16^b$ in its wall near the base of the measuring chamber. The float 13 is provided with a stem 17 which passes freely through holes in the top and bottom of the casing 15. The upper end of the stem 17 is bent and co-acts with a slotted arm $7^a$ depending from the rocking lever 7. The lower end of the stem carries a switch-member 18 which is adapted to co-act with contacts 19, $19^a$ having inclined or upturned ends and to which the conductors 20, $20^a$ of the solenoid 11 are connected by being clamped between the contacts and the bottom of the casing, as shown in Fig. 1.

The upper float 14 is mounted in a casing 21 carried by the cover 10 and communicating with the measuring chamber 1 by means of holes $21^a$ in its wall and holes $21^b$ in its lower end. The float is provided with a depending bent stem 22 which co-acts with a second slotted arm $7^b$ depending from the rocking lever 7 and carries a switch member 23 adapted to co-act with contacts 24, $24^a$ in the circuit of the solenoid 12 (see Fig. 9) and also having inclined or upturned ends.

As shown in Fig. 9, one end of the winding of each of the solenoids 11, 12 is connected to a common terminal 28 on the cover 10, to which terminal one terminal of a battery 29 or other source of electrical energy is also connected by a lead 30. The other ends of the windings of the solenoids 11, 12 are connected to terminals 31, 32, respectively. The other terminal of the battery 29 is connected by a lead 33 to a conductor 34 carrying two terminals 35, 36. The conductor 20 connects terminal 31 to contact 19, and conductor 20$^a$ connects contact 19$^a$ to terminal 35. Terminal 32 is connected by conductor 37 to contact 24$^a$, and contact 24 is connected by conductor 38 to terminal 36. Thus the circuit through solenoid 11 is from battery or source 29 by lead 30, terminal 28, the winding of solenoid 11, terminal 31, conductor 20, contact 19, switch-member 18 carried by lower float 13, contact 19$^a$, conductor 20$^a$, terminal 35, conductor 34 and lead 33 back to the battery or source 29. The circuit through solenoid 12 is from battery or source 29, by lead 30, terminal 28, the winding of solenoid 12, terminal 32, conductor 37, contact 24$^a$, switch-member 23 carried by upper float 14, contact 24, conductor 38, terminal 36, conductor 34 and lead 33 back to the battery or source 29.

It will be apparent that as the rocking lever 7 rocks from one position to the other on the operation of the valves 5, 6, the coöperation of the slotted arms 7$^a$, 7$^b$ and the bent stems 17, 22 partially rotates the floats 13, 14 and the switch-members 18, 23 relatively to the contacts 19, 19$^a$ and 24, 24$^a$. The switch-members and contacts are so arranged that when one switch-member is in vertical alinement with its coöperating contacts, the other switch-member is out of vertical alinement with its coöperating contacts.

The operation of the apparatus is as follows:

Assume the measuring vessel 1 to be filling. The valves 5, 6 and rocking lever 7 will be in the position shown in Figs. 1 and 2 and the switch-member 18 carried by the lower float 13 will be out of vertical alinement with its coöperating contacts 19, 19$^a$ and the switch-member 23 carried by the upper float 14 will be in vertical alinement with its coöperating contacts 24, 24$^a$, as shown best in Fig. 3. On the chamber 1 being filled and the float 14 lifted by the liquid which passes into the casing 21, the switch-member 23 co-acts with the underfaces of the upturned ends of the contacts 24, 24$^a$, thus closing the circuit through the solenoid 12 which raises the valve 6 to open the outlet 4 to the receiving chamber 2, the valve 5 being simultaneously depressed by the action of the rocking lever 7 to close the inlet 3. The movement of the rocking lever 7 partially rotates the two floats to disengage the switch-member 23 from contacts 24, 24$^a$, thus breaking the circuit of solenoid 12 simultaneously with the operation of the valves, and to bring switch-member 18 into vertical alinement with its complementary contacts 19, 19$^a$, as shown in Fig. 4. During the partial rotation of the floats, switch-member 23 rides down the inclined ends of contacts 24, 24$^a$, depressing float 14 against its buoyancy. On the emptying of receiving chamber 1 the lower float 13 falls and switch-member 18 contacts with contacts 19, 19$^a$ completing the circuit through solenoid 11 which then lifts valve 5 to open the inlet 3 and depress valve 6 to close outlet 4. During this movement of the rocking lever 7 the floats are partially rotated in the opposite direction, the switch-member 23 being moved into vertical alinement with contacts 24, 24$^a$ and switch-member 18 riding up the inclined ends of contacts 19, 19$^a$ against the weight of the float 13, and then disengaging same to break the circuit of solenoid 11 simultaneously with the changing over of the valves, as shown in Fig. 4.

The riding of switch members 18, 23 over the inclined ends of contacts 19, 19$^a$ and 24, 24$^a$ against the weight of float 13 and buoyancy of float 14 respectively, during the operation of the valves and simultaneous breaking of the circuits of the solenoids 11, 12, keeps the contacting surfaces clean and insures efficient electrical contact for the energizing of the solenoids.

In order to provide for any slight inequality between the contacts 19, 19$^a$ and 24, 24$^a$ or any interference with an efficient electrical contact between the switch-members 18, 23 and the contacts by vibration or inclination of the meter, the switch members may be capable of limited movement on their carrying stems 17, 22. Thus, as shown best in Figs. 5 and 6, switch-member 18 may be pivoted in a carrier 25 secured to the stem 17 and provided with projections 26 to limit the pivotal movement of the switch-member, and, as shown best in Figs. 7 and 8, switch member 23 may be pivoted on stem 22 and have its movement limited by a stop 27 thereon.

With the breaking of the circuits of the solenoids simultaneously with the operation of the valve, as above described, there is no waste of current through the circuits remaining closed until the floats fall or rise sufficiently to open the circuits.

What I claim as my invention, and desire to secure by Letters Patent is:

1. In a meter of the kind referred to, the combination of inlet and outlet valves, two electro-magnets for moving said valves, two switching members controlling the circuits respectively of said magnets, one of which is normally in position so that when actuated it will close its circuit while the other is out of position to close its circuit, and means whereby upon the movement of a valve the relative condition of the switch members will be reversed.

2. In a meter of the kind referred to, the combination of inlet and outlet valves, electro-magnetic means adapted to positively open and close said valves, and means whereby the movement of the valves by said means will also open the circuit of said electro-magnetic means.

3. In a meter of the kind referred to, the combination of an inlet valve and an outlet valve, two electro-magnets for opening said valves respectively, connections between the valves whereby when one is opened the other is closed, and means whereby the movement of said valves by either magnet will open the circuit of the actuating magnet.

In witness whereof I have hereunto set my hand.

WILLIAM BOWDEN.

Copies of this patent may be obtained for five cents each, by addressing the "Commissioner of Patents, Washington, D. C."